United States Patent [19]

Johansson et al.

[11] Patent Number: 4,477,090

[45] Date of Patent: Oct. 16, 1984

[54] PISTON RING ASSEMBLY FOR HYDRAULIC MECHANISMS, PARTICULARLY SUCH MECHANISMS FOR VERY HIGH OPERATING PRESSURES

[76] Inventors: Ingvar Johansson, Storlyckevägen 6, S-463 00 Lilla Edet; Hans A. Sterner, Petersbergsvägen 73, S-462 00 Vänersborg, both of Sweden

[21] Appl. No.: 501,333

[22] Filed: Jun. 6, 1983

[30] Foreign Application Priority Data

Jun. 4, 1982 [SE] Sweden .................. 8203485

[51] Int. Cl.³ .................. F16J 9/16; F16J 15/44
[52] U.S. Cl. .................. 277/174; 277/53; 277/83; 277/216; 277/236
[58] Field of Search .................. 277/12, 25, 32, 53, 277/54, 83, 173–178, 216, 217, 236, 47, 48

[56] References Cited

U.S. PATENT DOCUMENTS

| | | | |
|---|---|---|---|
| 2,585,952 | 2/1952 | Marien | 277/203 X |
| 2,871,072 | 1/1959 | Parks et al. | 277/203 X |
| 2,956,845 | 10/1960 | Wahlmark . | |
| 3,460,842 | 8/1969 | Pointer et al. | 277/53 X |
| 3,869,131 | 3/1975 | Derner | 277/71 X |

FOREIGN PATENT DOCUMENTS

| | | | |
|---|---|---|---|
| 42277 | 1/1888 | Fed. Rep. of Germany | 277/203 |
| 2440037 | 3/1976 | Fed. Rep. of Germany . | |
| 2904739 | 8/1980 | Fed. Rep. of Germany | 277/DIG. 8 |
| 610451 | 6/1926 | France | 277/174 |
| 1066934 | 1/1954 | France | 277/175 |
| 190707 | 5/1956 | Sweden . | |
| 210202 | 5/1956 | Sweden . | |
| 228279 | 11/1943 | Switzerland | 277/173 |
| 494433 | 10/1938 | United Kingdom | 277/174 |
| 1289937 | 9/1972 | United Kingdom | 277/1 |
| 676793 | 7/1979 | U.S.S.R. | 277/173 |

*Primary Examiner*—Robert S. Ward
*Attorney, Agent, or Firm*—Pollock, Vande Sande & Priddy

[57] ABSTRACT

A piston ring assembly for a piston of the type which is rigidly connected to the associated piston rod and which during its reciprocating motion in a cylinder has to be inclinable with its longitudinal axis by a small angle relative to the center axis of said cylinder, said piston being intended for use in hydraulic mechanisms with very high hydraulic fluid pressures and mainly axial piston machines. The piston is provided with a peripheral groove for accomodating the sealing piston ring assembly and said assembly consists of two or more annular and radially slitted washers of steel. For providing such a piston ring assembly which has improved sealing action and endurance but which still is simple and unexpensive in manufacture, the slitted washers have a thickness so selected in percent of the cylinder diameter that their slit width or gap will be substantially equal to zero for an intermediate value of the inclination angle between the longitudinal axis of the piston and the center axis of the cylinder and in that the piston groove has a depth sufficient for allowing a free relative sliding motion between the washers.

2 Claims, 2 Drawing Figures

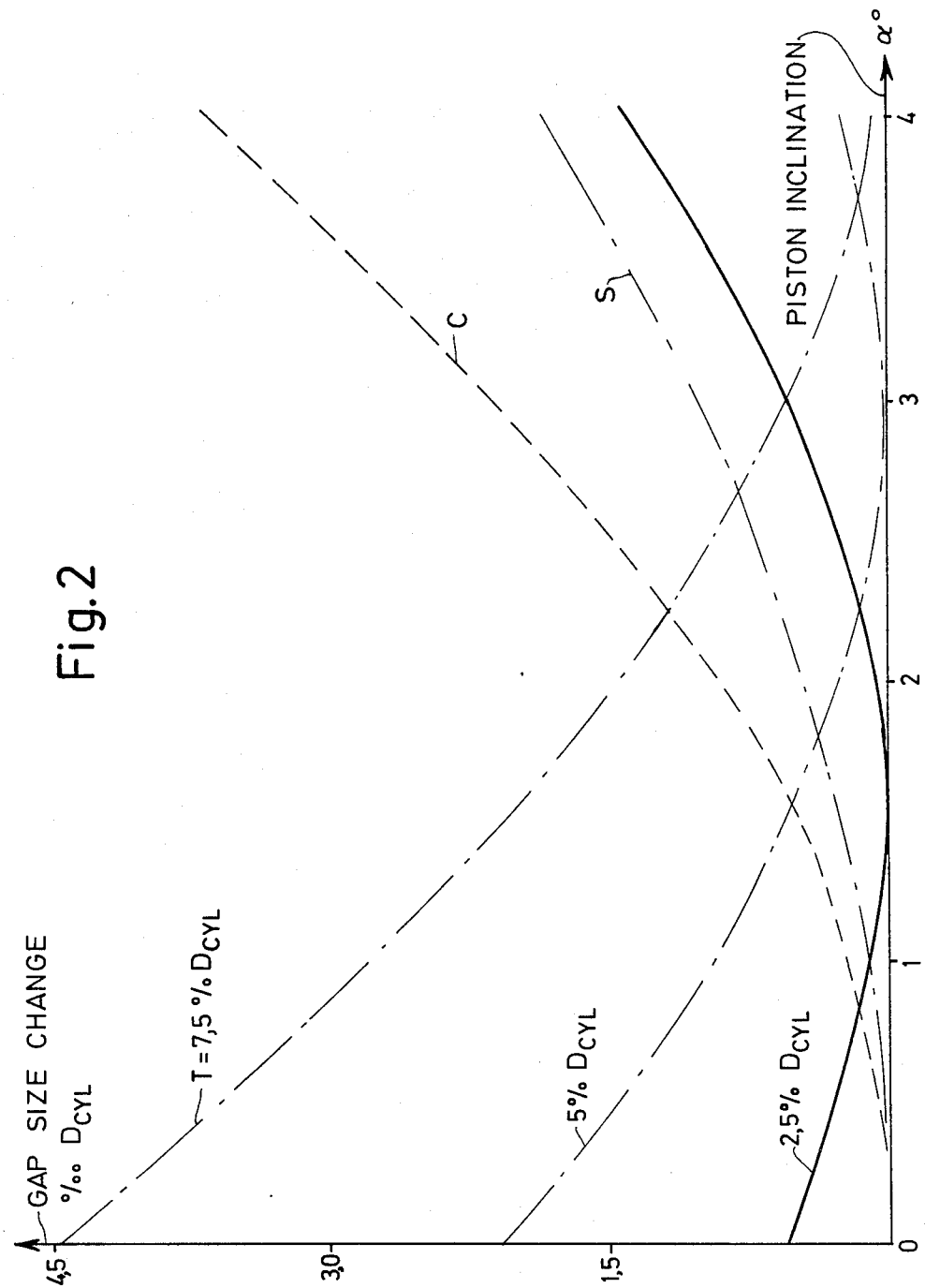

PISTON RING ASSEMBLY FOR HYDRAULIC MECHANISMS, PARTICULARLY SUCH MECHANISMS FOR VERY HIGH OPERATING PRESSURES

FIELD OF THE INVENTION

The present invention refers to a piston ring assembly for a piston of the type which is rigidly connected to the associated piston rod and which during its reciprocating motion in a cylinder has to be inclinable a small angle α with its longitudinal axis relative the centre axis of the cylinder. The piston is intended for use in hydraulic mechanisms with very high hydraulic fluid pressures, mainly axial piston machines. The piston is provided with a peripheral groove for accomodating the sealing piston ring assembly and said assembly has two or more annular and radially slitted washers of metal, particularly steel, which washers have a cylindrical outer peripheral surface and together form a kind of labyrinth seal to the hydraulic fluid.

BACKGROUND OF THE INVENTION

In pistons of this kind, the piston rings have hitherto been made conical or spherical for obtaining a sealing action also when the piston is inclined with its longitudinal axis at an angle relative the centre axis of the cylinder. In the Swedish patent specifications Nos. 190,707 and 210,202, various designs of sealing piston ring assemblies having spherical peripheral surfaces for engagement with the cylinder wall are described. When applying the inventive concepts described in said pair of specifications in industrial mass production it has turned out, however, that the spherical piston rings in this connection exhibit some drawbacks.

Thus the spherical ring is relatively expensive to manufacture in mass production since it requires for its good operation a very careful machining of the spherical surface. Mainly said machining includes grinding which however is difficult to carry out since problems are encountered in securing the ring rigidly during grinding. Most particularly this applies to the smallest ring dimensions in the smallest axial piston machine sizes. Under all circumstances the grinding of the rings is a time-consuming and cumbersome procedure which hence is expensive.

In the known spherical piston ring there also occurs an unavoidable leakage through the gap of the radially slitted ring. The diameter of the ring is dimensioned such that the tangential extent or the width of said gap will be approximately zero when the longitudinal axis of the piston rod and the piston coincides with the centre axis of the cylinder. For increasing inclination angles therebetween, the ring gap will increase progressively due to the fact that over half of its periphery the ring must assume an elliptical shape in order to seal against the cylinder wall. The ring gap achieves its greatest width at the maximal inclination of the longitudinal axis of the piston and piston rod from the cylinder centre axis, this inclination being of the order of up to 4°.

The leakage losses through the gap are not alone of determining importance per se. At the high pressures used nowadays for the working fluid in for instance axial piston machines of the kind set forth, amounting to the order of 300–400 bar and in a not too remote future perhaps increased to 500–700 bar, such leakage through the gap means that erosion damages will occur due to the very high flow velocity of the leaking fluid. Such erosion damages primarily hit the cylinder walls but also the pistons get such damages. The aforementioned circumstance that the ring during its reciprocatory motion in the cylinder has to adopt over half of periphery an elliptic cross section at least two times per revolution of the cylinder drum also implies the occurence of bending stresses which in turn might cause fatigue ruptures of the ring.

Investigations also have proved that the spherical piston ring is worn due to the fact that the ring is in a state of pressure unbalance over half its periphery while in operation. Due to said wear the width of the gap will increase. A wear which moreover is rapidly self-increasing very soon leads to leakage losses through the gap of such a magnitude that they will have decisive influence on the operation of the machine.

In a purely parallel or translatory piston rod movement in the cylinder without the occurence of an inclination of the piston, there has been utilized in applications having relatively low pressures a piston ring assembly consisting of a plurality of mutually equal cylindrical rings such as disclosed in the German patent publication No. 2,440,037. Should attempts be made to apply said piston ring structure in spherical pistons, i.e. inclinable pistons, there has to be taken into consideration the same decisive drawbacks as to the width of the ring gaps and leakage caused thereby as well as the liability to erosions as in the spherical piston rings.

DISCLOSURE OF THE INVENTION

Thus the ring gap and its width variations has a great influence on good and enduring operation of such machines and it was therefore considered as important to investigate whether any other ring structure could be developed which might operate better and more reliable than the spherical piston ring but preferably still be simpler and less expensive to manufacture than the last-mentioned.

This has now turned out to be possible in a surprisingly simple manner. The features substantially distinguishing the invention are that the slitted washers have a thickness so selected in percent of the cylinder diameter that they have a slit width or gap size substantially equal to zero for an intermediate value of the angle between the longitudinal axis of the piston and the centre axis of the cylinder, and that the piston ring groove has sufficient depth for allowing a free relative slidng motion between the washers without obstructing the inclining movements of the piston in the cylinder.

With the assembly according to the invention, there is now achieved washers which through their selected thickness will cooperate with the cylinder wall in another and more advantageous motion sequence of the ring gap than in the spherical piston ring as will be further described in the following description. At the same time it is also achieved, however, that such washers can be manufactured in an extremely simple an inexpensive manner, namely by a simple stamping process from a sheet metal material having the required properties.

BRIEF DESCRIPTION OF THE DRAWINGS

By way of example, the invention will be further described below with reference to the accompanying drawing in which FIG. 2 is a diagram of the relation between the size of the gap of the spherical piston ring and of a cylindrical washer according to the present invention, respectively, as dependent on the inclination of the piston in the cylinder bore.

DESCRIPTION OF BEST MODE AND OTHER EMBODIMENTS

Figure 1:
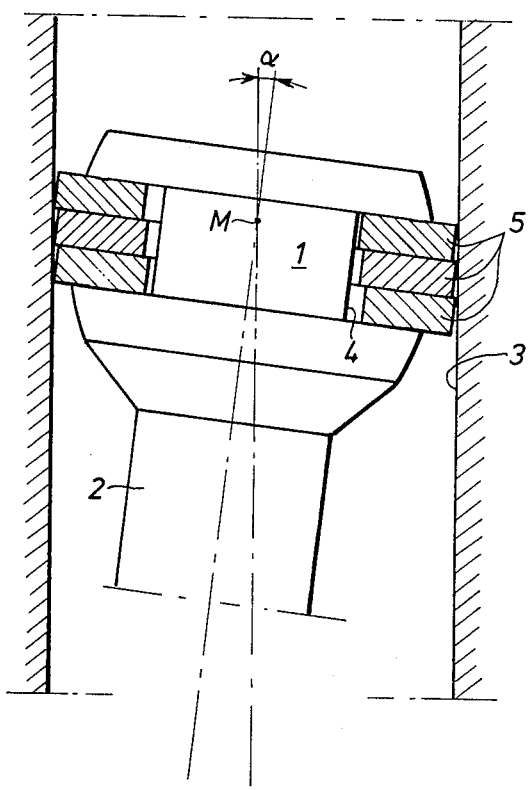
FIG. 1 is a diagrammatical sketch of a piston ring assembly according to the invention in e.g. an axial piston machine.

In FIG. 1 of the drawing there is illustrated in a diagrammatic longitudinal section a piston 1 rigidly connected with an associated piston rod 2 and movable to and fro in a surrounding cylinder 3. During its motion the unit consisting of the piston 1 and the piston rod 2 is inclined with its longitudinal axis at a small angle $\alpha$ relative to the centre axis of the cylinder 3. The angle $\alpha$ amounts in axial piston machines of the present type to about 3°–4°.

For providing a seal between the piston 1 and the wall of the cylinder 3 the piston is made with a circumferential groove 4 which generally is arranged in or closely adjacent to a transverse plane through the centre M of the spherical piston and in which a piston ring assembly according to the invention is located. Said assembly consists of two or more, in the present case three, annular radially slitted washers 5 having a cylindrical outer peripheral surface. Owing to their cylindrical outer peripheral surface said washers 5 which act as piston rings are simple to manufacture which for instance can be carried out by stamping from sheet steel having suitable thickness and required material properties. Usually no particular finishing machining will be required but when needed the edges of the washers might be chamfered.

Contrary to the above-mentioned prior spherical piston rings which are dimensioned such that their gap size is minimum and substantially equal to zero when the longitudinal axis of the piston coincides with the centre axis of the cylinder and which are mounted into the cylinder with an inherent pre-tension radially outwards, the slitted washers 5 according to the present invention are dimensioned such that they have a gap size or a slit width substantially equal to zero for an intermediate value of the angle $\alpha$ between the longitudinal axis of the piston and the centre axis of the cylinder. Then the gap increases to either side of said $\alpha$ value such that the slit width is clearly greater both at $\alpha=0$ and at $\alpha$max, i.e. for the maximum inclination of the piston 1 relative the cylinder 3, which maximum angle might amount to about 4° or more but preferably is 3° in machine designs now applied. Thus the washers according to the invention are squeezed to the slit width zero by radially inwardly directed forces from the cylinder wall during the motions of the piston.

The above-stated relations have been more closely disclosed in the diagram in FIG. 2 in which the changes of the slit width or the gap has been illustrated in per mille of the cylinder diameter $D_{CYL}$ for various thicknesses of the ring or the washer 5 expressed in percent of the cylinder diameter $D_{CYL}$ as a function of the inclination angle $\alpha$ of the piston in the cylinder 3. From the diagram it is also clearly evident that for the ring thickness T of 2.5% of $D_{CYL}$ is obtained the most particularly advantageous case when the slit width is of equal size at both $\alpha$max and at $\alpha=0$ and zero at $(\alpha/2)$. For the purpose of comparison it has also been drawn in said diagram corresponding curves for a spherical and a conical piston ring, S and C respectively.

Over a numerically smaller slit width and hence reduced detrimental hydraulic fluid leakage this also means, however, that the flexural amplitude which is proportional to the change of the gap size can be reduced to about half as much in a cylindrical ring as is the case in a spherical piston ring and even to a quarter of what is the case in a conical piston ring.

The piston ring assembly according to the present invention composed of two or more washers 5 also has several other operational advantages. Thus the arrangement of two or more slitted washers axially adjacent each other means that there is correspondingly obtained several restrictions located in an axial row for reducing hydraulic fluid leaking therethrough and such a serious restriction has a very great effect as far as the reduction of high flow velocities otherwise occurring at great pressure drops is concerned. Of course a further advantage is that possible surface roughnesses in the cylinder wall more easily are bridged by a plurality of washer-like piston rings according to the invention. The piston ring assembly also operates as well during a suction stroke when the machine is working as a pump, which is a difference compared with the spherical piston ring.

As dimensional examples, there can be mentioned that for a piston diameter of 19 mm a piston ring groove with a width of 2.1 mm is arranged when using a spherical piston ring. The spherical piston ring initially intended for said groove should have had a thickness of 2.0 mm but according to the present invention there can be used instead 4 piston rings stamped from sheet steel material of 0.5 mm thickness such that when laying these four rings together the same total thickness is obtained as for the spherical ring. With so many washer-like rings 5 the width of the four ring gaps will have insignificant influence on the leakage. For obtaining a satisfying function of the piston ring device it is only required that sufficient clearance is present between the inner edge surfaces of the rings 5 and the bottom of the ring groove 4 such that the rings freely can move or slide mutually in said groove so as to always engage the cylinder wall during the inclination motions of the piston 1. Said mutual sliding motion between the washer-like rings for obtaining the satisfying sealing action has turned out to be easy to achieve since the washers have a very smooth surface and run well-oiled by hydraulic fluid. The rings might be concentric but also eccentric, if desired.

We claim:

1. A piston ring assembly for a piston which is rigidly connected to an associated piston rod and which during its reciprocating motion in a cylinder has its longitudinal axis inclined through a small angle relative to the center axis of said cyliner, said piston being intended for use in hydraulic mechanisms with very high hydraulic fluid pressures such as axial piston machines, said piston being provided with a peripheral groove for accommodating a sealing piston ring assembly, said ring assembly comprising: a plurality of annular and radially slitted metal washers each having a cylindrical outer peripheral surface and a thickness relative to the cylinder diameter such that the width of the radial slit is substantially equal to zero at an intermediate value of the inclination angle between the longitudinal axis of the piston and the center axis of the cylinder; and, a piston groove having a depth sufficient to allow free relative sliding motion between said washers without obstructing the inclining movements of the piston in the cylinder.

2. A piston ring assembly as set forth in claim 1, in which the thickness of each of said washers is about 2.5% of the diameter of the cylinder.

* * * * *